(12) United States Patent
Bali et al.

(10) Patent No.: US 12,402,031 B2
(45) Date of Patent: Aug. 26, 2025

(54) CONVERGED WIRED AND WIRELESS ACCESS OPTIMIZATION

(71) Applicant: Charter Communications Operating, LLC, St. Louis, MO (US)

(72) Inventors: Ramneek Bali, Aurora, CO (US); Diwelawatte PJ Jayawardene, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 334 days.

(21) Appl. No.: 18/300,516

(22) Filed: Apr. 14, 2023

(65) Prior Publication Data

US 2024/0349114 A1   Oct. 17, 2024

(51) Int. Cl.
*H04W 28/02* (2009.01)
*H04W 72/56* (2023.01)

(52) U.S. Cl.
CPC ... *H04W 28/0289* (2013.01); *H04W 28/0273* (2013.01); *H04W 72/56* (2023.01)

(58) Field of Classification Search
CPC ......... H04W 28/0289; H04W 28/0273; H04W 72/56; H04W 28/0247; H04W 72/52
See application file for complete search history.

(56) References Cited

U.S. PATENT DOCUMENTS

| | | |
|---|---|---|
| 11,252,742 B2 | 2/2022 | Andreoli-Fang et al. |
| 2017/0245177 A1* | 8/2017 | Yadav .................. H04L 43/0882 |
| 2021/0281445 A1* | 9/2021 | Trim .................... H04L 12/4641 |
| 2022/0191737 A1* | 6/2022 | Mindler ............ H04W 28/0967 |

* cited by examiner

*Primary Examiner* — Khoa Huynh
(74) *Attorney, Agent, or Firm* — Young Basile Hanlon & MacFarlane, P.C.

(57) ABSTRACT

Methods and systems for converged wired and wireless access optimization are described. An access system includes a wired access system, a wireless access system deployed on the wired access system, and a resource controller in communication. The resource controller determines whether traffic usage data collected from the wired access system and the wireless access system breaches one or more congestion thresholds, determines which of the wired access system and the wireless access system is a breaching access system; determines, for the breaching access system, a contributory percentage of the traffic usage data with respect to a breached congestion threshold, and initiates resource reduction at a lower priority access system when the contributory percentage of the breaching access system is same or less than a non-breaching access system, where the lower priority access system is one of the wired access system or the wireless access system.

20 Claims, 6 Drawing Sheets

4000

| measurement | | DOCSIS / RAN | | |
|---|---|---|---|---|
| | | Throughput | Latency | Packet Loss |
| UP stream | | W1 | W2 | W3 |
| Down stream | | W2 | W1 | W3 |

FIG. 4

CONVERGED WIRED AND WIRELESS ACCESS OPTIMIZATION

TECHNICAL FIELD

This disclosure relates to network communications. More specifically, providing dual axis access management to inter-related or converged wired and wireless connectivity systems.

BACKGROUND

Service providers provide Internet and deliver content (collectively "services") to its customers anywhere and on any device using a service provider infrastructure which includes both wired and wireless access and connectivity. The customers would carry their services, policies (pause, parental control), and identity with them wherever they go. The service providers provide wired or broadband (collectively "wired") access and connectivity via coaxial cables or hybrid fiber coaxial cables (collectively "coaxial cable system"). The service providers provide wireless, cellular, and/or mobile (collectively "wireless") access and connectivity by deploying small cells via base stations connected to the coaxial cable system.

Provision and/or performance of the services via the wired and/or wireless access systems can be impacted by the load placed on the wired and wireless access systems. For example, if the load on the wireless access system increases then it will negatively impact on the wired users using the wired access system and if the load on the wired access system increases then it will negatively impact on our wireless users using the wireless access system. Each of the wired and wireless access systems employ different management systems including resource management and do not exchange information with the other system. There currently does not exist mechanisms for exchanging traffic, load, resource, and other data to resolve the issue of negative performance incurred by a system due the other system.

SUMMARY

Disclosed herein are methods and systems for converged wired and wireless access optimization. In implementations, an access system includes a wired access system, a wireless access system deployed on the wired access system and a resource controller in communication with the wired access system and the wireless access system. The resource controller is configured to determine whether traffic usage data collected from the wired access system and the wireless access system breaches one or more congestion thresholds, determine which of the wired access system and the wireless access system is a breaching access system; determine, for the breaching access system, a contributory percentage of the traffic usage data with respect to a breached congestion threshold, and initiate resource reduction at a lower priority access system when the contributory percentage of the breaching access system is same or less than a non-breaching access system, where the lower priority access system is one of the wired access system or the wireless access system. In implementations, the resource controller is further configured to initiate resource reduction at a higher priority access system when a minimum resource threshold is reached by the lower priority access system and congestion is still present.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 4 is a diagram of an example of a threshold matrix in accordance with embodiments of this disclosure.

DETAILED DESCRIPTION

Figure 1:
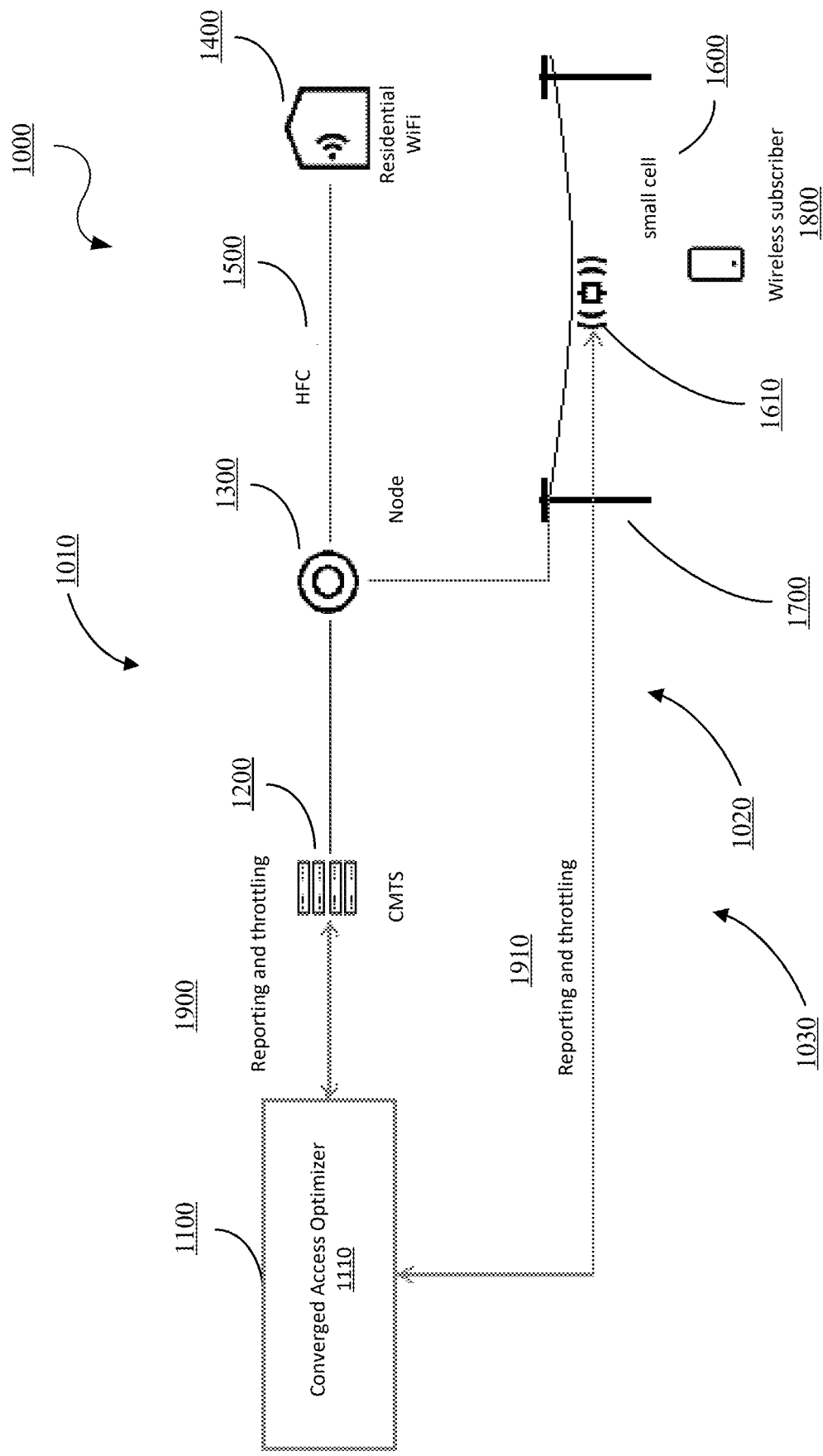
FIG. 1 is a diagram of an example of a network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for converged wired and wireless access optimization. In implementations, a converged wired and wireless access controller ("converged access controller") can obtain traffic, load, resource, and other data (collectively "traffic usage data") from a wired access system and components ("wired access system") and from a wireless access system and components ("wireless access system") (collectively "converged access system"). The converged access controller can analyze the traffic usage data against one or more configurable congestion or usage thresholds to determine the occurrence of a congestion condition. Resource control or reduction measures or mechanisms (collectively "resource control management") can be initiated in the event of a breach of the one or more configurable usage thresholds. That is, in the event of an occurrence of congestion on one or both of the wired access system or the wireless access system. The converged access controller can determine which of the wired access system or the wireless access system caused the congestion, contributory percentage of each access system to a breached threshold, which access system has priority, and initiate resource control management accordingly.

In implementations, resource control management can be applied to one or both of the wired access system and/or the wireless access system. Both axes of the converged access system are subject to resource control since both axes of the converged access system contribute to the traffic usage data and one axis of the converged access system can affect the other axis of the converged access system. In implementations, resource control management to one axis may not be sufficient to correct the congestion.

In implementations, the converged access system permits designation of one of the wired access system and/or the wireless access system as a priority access system. The designation can be input by a user, set based on time of day, set based on a temporal schedule, set based on temporal windows, set based on load history, set based on traffic usage history, set based on other factors, and/or combinations thereof.

In implementations, the one or more configurable congestion or usage thresholds can be uplink or upstream traffic volume threshold, downlink or downstream traffic volume threshold, downlink or downstream latency threshold, uplink or upstream latency threshold, uplink or upstream throughput threshold, downlink or downstream throughput threshold, uplink or upstream packet loss threshold, downlink or downstream packet loss threshold, other traffic characterization thresholds, and/or combinations thereof. In implementations, the one or more of the one or more configurable congestion or usage thresholds can have different weights. That is, one or more of the one or more configurable congestion or usage thresholds may have a higher priority.

In implementations, the traffic usage data can include one or more of uplink or upstream traffic volume, downlink or downstream traffic volume, downlink or downstream latency, uplink or upstream latency, uplink or upstream throughput, downlink or downstream throughput, uplink or upstream packet loss, downlink or downstream packet loss, and/or other traffic measurements. In implementations, the traffic usage data can be measured at a system level, channel level, application level, directional traffic flow level, and/or combinations thereof. In implementations, one or more of the traffic usage data can have different weights. That is, one or more of the one or more of the traffic usage data may have a higher priority.

FIG. 1 is a diagram of an example network architecture 1000. The network architecture 1000 can include a service provider server, network, or cloud (collectively "service provider server") 1100 in a back office, cable modem termination system (CMTS) and/or other headend devices 1200, a connection or communication node 1300, and one or more customer premises equipment (CPE) 1400 at offices and/or residences which are connected together via a coaxial cable system 1500 to provide services via wired or broadband access (collectively "wired access system 1010"). The network architecture 1000 can further include small cells 1600 deployed on the wired access system via the node 1300 and the coaxial cable system 1500. The small cells 1600 can be implemented using base stations 1610 connected to infrastructure 1700 such as utility infrastructure, buildings, and the like. The small cells 1600 and the base stations 1610 (collectively "wireless access system 1020") can provide services to wireless users or subscribers 1800. The wireless access system 1020 uses the wired access system 1010 as a backhaul system for transmitting traffic and/or control data. The wired access system 1010 and the wireless access system 1020 can be referred to as a converged access system 1030. The network architecture 1000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The service provider server 1100 can include a converged access optimizer or resource controller (collectively "resource controller") 1110 which can include a wired reporting and control interface 1900 with the wired access system 1010 and components therein and a wireless reporting and control interface 1910 with the wireless access system 1020 and components therein to receive traffic usage data and transmit resource control management instructions and/or messages based the received traffic usage data as described herein. The wired reporting and control interface 1900 and the wireless reporting and control interface 1910 are logical connections over existing physical connections.

The CMTS 1200 provides high speed data services, such as cable Internet or Voice over Internet Protocol, to service provider subscribers. The wired access system 1010, including the service provider server 1100, the CMTS 1200, and the coaxial cable system 1500, may be Data Over Cable Service Interface Specifications (DOCSIS) compliant, where DOCSIS is a telecommunications standard that permits high-bandwidth data transfer, cable Internet access, and other services over the coaxial cable system 1500.

The connection or communication node 1300 is a transfer or interchange device so that small cells can be deployed over and connected to the coaxial cable system 1500. In implementations, the connection or communication node 1300 is a hybrid fiber coaxial cable (HFC) node and the small cell(s) 1600 can be deployed on the HFC infrastructure, i.e., the coaxial cable system 1500. The small cell(s) 1600 and wired or broadband customers will use the same HFC node(s) 1300 for carrying the traffic.

The one or more CPE 1400 can be modems, gateways, routers, access points, and/or other devices that provide the services at the customer premises.

The small cell(s) 1600 and base station(s) 1610 are low-powered cellular radio access nodes (RAN) that have a usage range of 10 meters to a few kilometers. The wireless access system 1020, including the small cell(s) 1600 and base station(s) 1610, is used to provide in-building service, provide outdoor wireless service, extend service provider coverage, increase service provider network capacity, and/or combinations thereof to wireless subscribers such as the wireless subscriber 1800. The wireless access system 1020 uses the wired access system 1010 as a backhaul system for transmitting traffic and/or control data.

Figure 2:
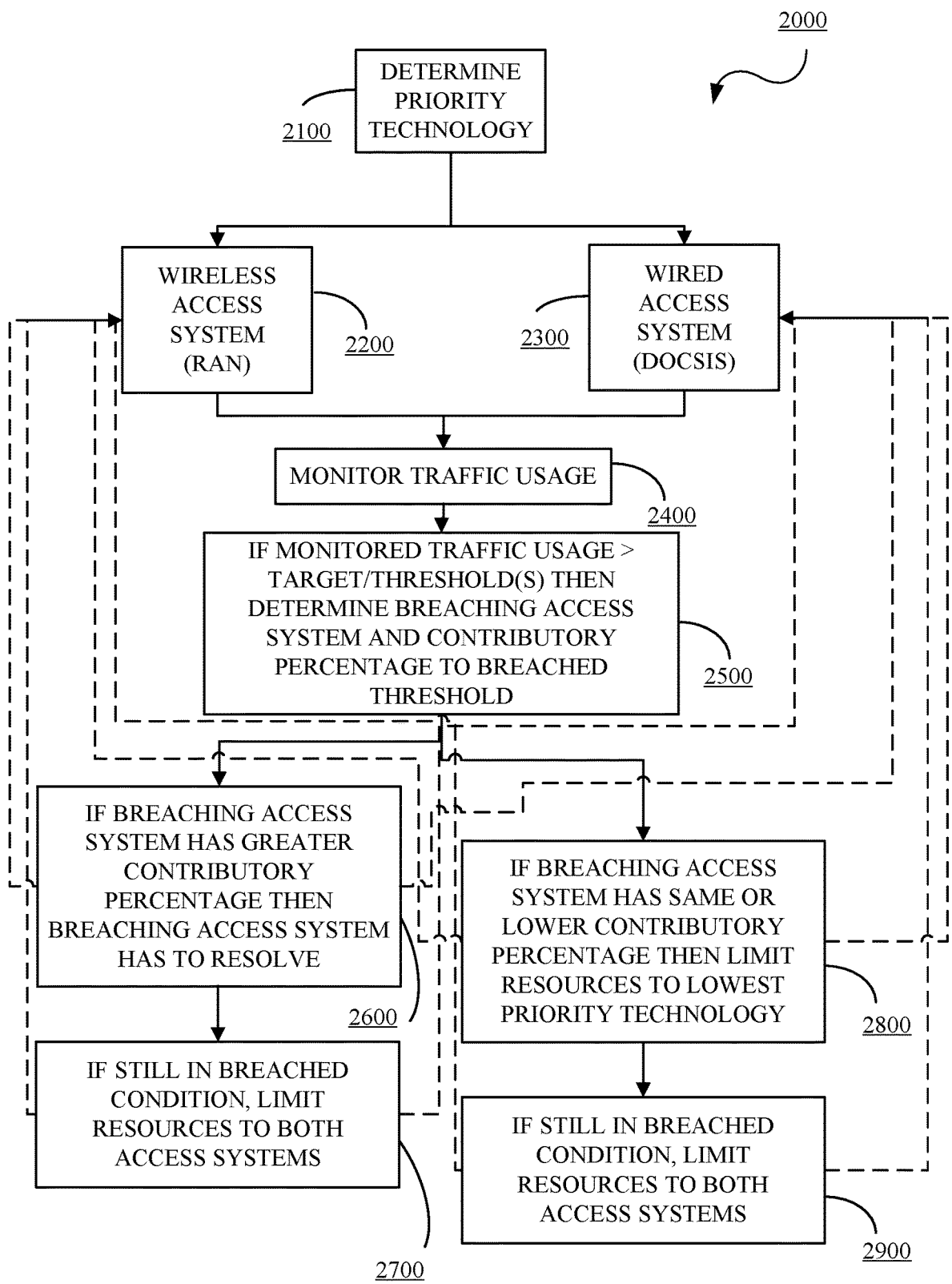
FIG. 2 is a flow diagram of an example flow of converged wired and wireless access optimization in accordance with embodiments of this disclosure.
Figure 3:
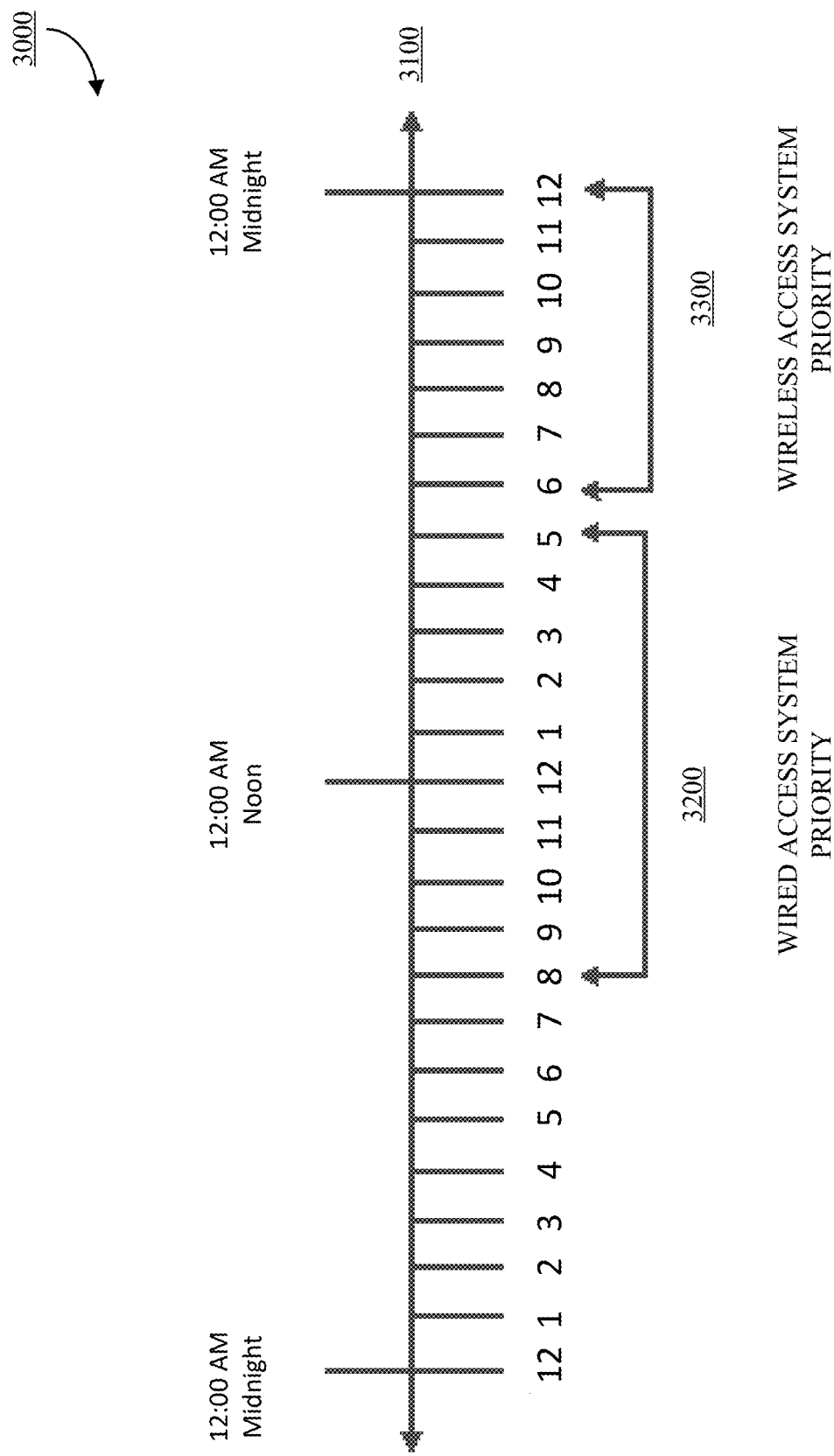
FIG. 3 is a diagram of an example of a sliding window in accordance with embodiments of this disclosure.

FIG. 2 is a flow diagram of an example flow 2000 of converged wired and wireless access optimization in accordance with embodiments of this disclosure. Referring now to FIGS. 1-2, the resource controller 1110 can determine which of a wired access system 2200 or a wireless access system 2300 has priority with respect to usage of a converged access system (2100). In implementations, priority may be assigned via a user input to the resource controller 1110. In implementations, priority may be set based on historical data. In implementations, priority may be based on time-of-day using, for example, a configurable, sliding window. FIG. 3 is a diagram of an example of a priority sliding window mechanism 3000 in accordance with embodiments of this disclosure. A time period 3100 is divided into defined time intervals. Each access system has a priority time window, i.e., window 3200 is when the wired access system 2200 has priority and window 3300 is when the wireless access system 2300 has priority. The window 3200 and the window 3300 are configurable. In implementations, historical data may be used to determine the window 3200 and the window 3300. In implementations, the assignment of priority is dynamic and/or configurable.

The resource controller 1110 can collect traffic usage data from the wired access system 2200 and the wireless access system 2300 (2400). In implementations, the traffic usage data can be collected from or with respect to, but is not limited to, one or more traffic or bearer channel(s), one or more downlink/downstream and/or uplink/upstream traffic flow(s), one or more quality of service (QoS) class identifier(s) (QCI), application specific flows, one or more upstream and/or downstream orthogonal frequency division multiplexing access (OFDMA) channels and/or single carrier quadrature amplitude modulation (SC-QAM) channels (each may be referred to as a "traffic usage measurement element"). In implementations, one or more of the traffic usage measurement elements can have different weights. That is, priority can be given to certain types of traffic usage measurement elements. In implementations, the assignment of weights is dynamic and/or configurable. In implementations, the assignment of weights may be time-of-day dependent. In implementations, the assignment of weights may be based on historical data.

In implementations, the one or more of the traffic usage data collected for the one or more traffic usage measurement element(s) can include, but is not limited to, one or more of uplink or upstream data volume over a defined time period, downlink or downstream data volume over a defined time period, downlink or downstream round trip time, uplink or upstream round trip time, uplink or upstream throughput, downlink or downstream throughput, uplink or upstream packet loss, downlink or downstream packet loss, and/or other traffic measurements. The one or more of the traffic usage data represents end-to-end data in the converged access system 1030. In implementations, the one or more of the traffic usage data can have different weights. That is, priority can be given to certain types of traffic usage data. In implementations, the assignment of weights is dynamic and/or configurable. In implementations, the assignment of weights may be time-of-day dependent. In implementations, the assignment of weights may be based on historical data.

The resource controller 1110 can monitor and/or analyze the collected traffic usage data from the one or more traffic usage measurement element(s) against one or more congestion thresholds to determine if congestion exists in one or both of the wired access system 1010 and the wireless access system 1020 (2500). The one or more congestion thresholds can include, but is not limited to, uplink or upstream data volume per time interval threshold, downlink or downstream data volume per time interval threshold, downlink or downstream latency threshold, uplink or upstream latency threshold, uplink or upstream throughput threshold, downlink or downstream throughput threshold, uplink or upstream packet loss threshold, and downlink or downstream packet loss threshold. In implementations, the one or more congestion thresholds can have different weights. That is, priority can be given to certain types of congestion thresholds. In implementations, the assignment of weights is dynamic and/or configurable. In implementations, the assignment of weights may be time-of-day dependent. In implementations, the assignment of weights may be based on historical data.

FIG. 4 is a diagram of an example of a threshold matrix 4000 in accordance with embodiments of this disclosure. The threshold matrix 4000 may be used by the resource controller 1110 to determine if congestion exists in the converged access system 1030 and which one or more of the traffic usage measurement elements is contributing to the congestion. In the example threshold matrix 4000, each access system (DOCSIS representing the wired access system 1010 and RAN representing the wireless access system 1020) is measuring and analyzing throughput, latency, and packet loss data in the upstream and downstream. In this example, a weight of W1 is being applied to upstream throughput data and downstream latency data, a weight of W2 is being applied to upstream latency data and downstream throughput data, and a weight of W3 is being applied to upstream packet loss data and downstream packet loss data.

Referring back to FIGS. 1-2, in the event of congestion, the resource controller 1110 can determine which of the wired access system 2200 and the wireless access system 2300 is causing the congestion in the converged access system (the "breaching access system"). In implementations, the breaching access system can be based on which one(s) of the one or more traffic usage measurement element(s) has breached a corresponding congestion threshold. As both the wired access system 2200 and the wireless access system 2300 use the wireless access system 2300, the resource controller 1110 can determine a contributory percentage of the traffic usage data with respect to the breached congestion threshold.

If the breaching access system contributes more traffic usage data with respect to the breached congestion threshold in comparison with a non-breaching access system, then the resource controller 1110 initiates resource control management and/or instructs the breaching access system to reduce resources (2600). In implementations, if the breaching access system is the wired access system 2200 then reduction may include reservation of SC-QAM channels, OFDMA channels, or combinations thereof. That is, the number of channels used for the traffic usage data is reduced.

In implementations, if the breaching access system is the wireless access system 2300 then reduction may include reduction of resource blocks per session, initiation of congestion control, or combinations thereof. In either instance, the breaching access system applies resource reduction first to existing or active sessions and then to new sessions. Each breaching access system has a minimum resource threshold to maintain a defined level of existing or active sessions and new sessions. The minimum resource threshold may be different values for each of the wired access system 2200 and the wireless access system 2300. If the resource reductions by the breaching access system meet the appropriate minimum resource threshold and the congestion is still present, then the resource controller 1110 can initiate resource control management on the non-breaching access system as described herein (2700).

If the breaching access system contributes the same or less traffic usage data with respect to the breached congestion threshold in comparison with a non-breaching access system, then the resource controller 1110 initiates resource control management and/or instructs the lower priority access system to reduce resources as described herein (2800). If the resource reductions by the lower priority access system meet the appropriate minimum resource threshold and the congestion is still present, then the resource controller 1110 can initiate resource control management on the higher priority access system as described herein (2900).

In implementations, the collected traffic usage data may be analyzed by the resource controller 1110 to identify specific channels, specific issues such as, but not limited to, service quality, latency, throughput, jitter, and/or packet loss, and combinations thereof.

Figure 5:
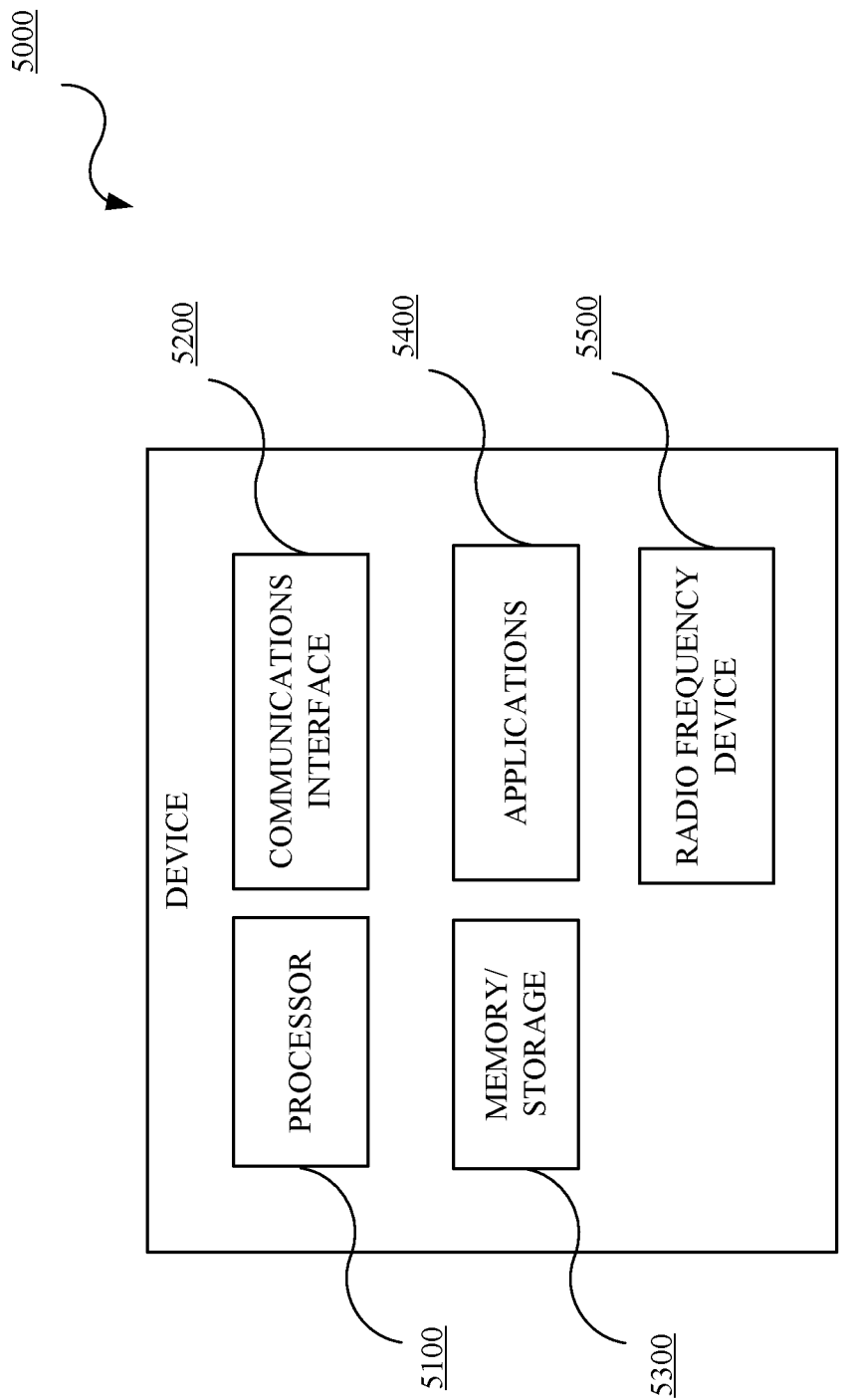
FIG. 5 is a block diagram of an example of a user device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, applications 5400, and a radio frequency device 5500. The device 5000 may include or implement, for example, any of the CPEs 1400, the wireless users or subscribers 1800, small cell(s) 1600, and/or base station(s) 1610. The applicable or appropriate techniques or methods described herein may be stored in the memory/storage 5200 and executed by the processor 5100 in cooperation with the memory/storage 5200, the communications interface 5300, the applications 5400, and the radio frequency device 5500, as appropriate. The device 5000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 6:
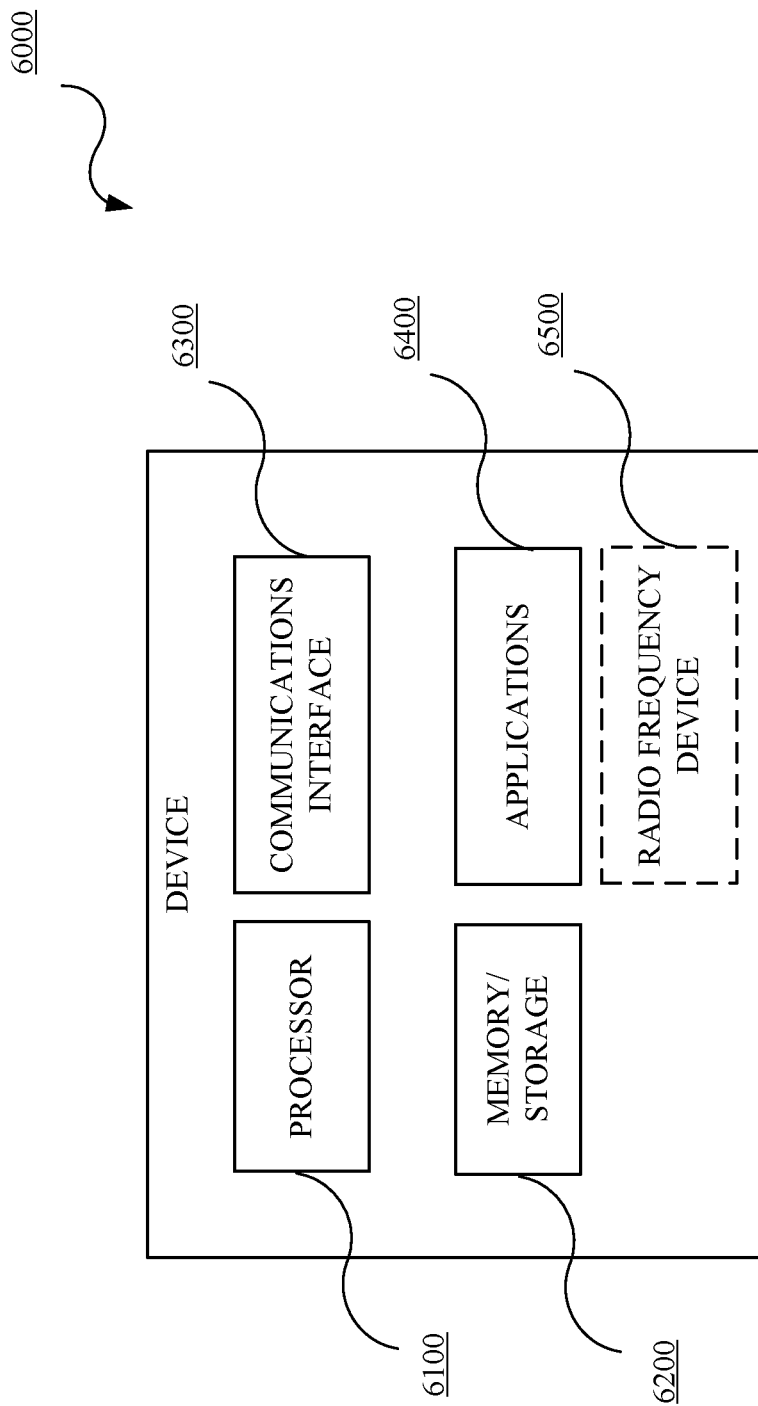
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. In an implementation, the device 6000 may include a radio frequency device 6500. The device 6000 may include or implement, for example, the converged access optimizer 1110, the CMTS 1200, the node 1300, and/or the CPEs 1400. The applicable or appropriate techniques or methods described herein may be stored in the memory/storage 6200 and executed by the processor 6100 in cooperation with the memory/storage 6200, the communications interface 6300, the applications 6400, and the radio frequency device 6500 (when applicable), as appropriate.

The device 6000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Described herein are systems and methods for converged wired and wireless access optimization. In implementations, an access system includes a wired access system, a wireless access system deployed on the wired access system, and a resource controller in communication with the wired access system and the wireless access system. The resource controller is configured to determine whether traffic usage data collected from the wired access system and the wireless access system breaches one or more congestion thresholds, determine which of the wired access system and the wireless access system is a breaching access system, determine, for the breaching access system, a contributory percentage of the traffic usage data with respect to a breached congestion threshold, and initiate resource reduction at a lower priority access system when the contributory percentage of the breaching access system is same or less than a non-breaching access system, wherein the lower priority access system is one of the wired access system or the wireless access system.

In implementations, the resource controller is further configured to initiate resource reduction at a higher priority access system when a minimum resource threshold is reached by the lower priority access system and congestion is still present. In implementations, the minimum resource threshold maintains a defined level of traffic usage on an applicable one of the wired access system and the wireless access system. In implementations, the resource controller is further configured to initiate resource reduction at the breaching access system when the contributory percentage of the breaching access system is greater than the non-breaching access system. In implementations, the resource controller is further configured to initiate resource reduction at the non-breaching access system when a minimum resource threshold is reached by the breaching access system and congestion is still present. In implementations, a priority for the wired access system and the wireless access system is set based on temporal sliding windows. In implementations, some of the one or congestion thresholds are weighted more than others of the one or more congestion thresholds. In implementations, some types of the traffic usage data are weighted more than other types of the traffic usage data.

Described herein are systems and methods for converged wired and wireless access optimization. In implementations, a method for resource management in a converged access system includes determining, by a converged access optimizer, whether traffic usage data collected from a wired access system and a wireless access system breaches one or more congestion thresholds, determining, by the converged access optimizer, which of the wired access system and the wireless access system is a breaching access system, determining, by the converged access optimizer for the breaching access system, a traffic usage data contribution level with respect to a breached congestion threshold, and initiating, by the converged access optimizer, resource reduction at a lower priority access system when the traffic usage data contribution level of the breaching access system is same or less than a non-breaching access system, wherein the lower priority access system is one of the wired access system or the wireless access system.

In implementations, the method further includes initiating, by the converged access optimizer, resource reduction at a higher priority access system when a minimum resource threshold is reached by the lower priority access system and congestion is still present. In implementations, the minimum resource threshold maintains a defined level of traffic usage on an applicable one of the wired access system and the wireless access system. In implementations, the method further includes initiating, by the converged access optimizer, resource reduction at the breaching access system when the traffic usage data contribution level of the breaching access system is greater than the non-breaching access system. In implementations, the method further includes initiating, by the converged access optimizer, resource reduction at the non-breaching access system when a minimum resource threshold is reached by the breaching access system and congestion is still present. In implementations, a priority for the wired access system and the wireless access system is set based on temporal sliding windows. In implementations, some of the one or congestion thresholds are weighted more than others of the one or more congestion thresholds. In implementations, some types of the traffic usage data are weighted more than other types of the traffic usage data.

Described herein are systems and methods for converged wired and wireless access optimization. In implementations, a converged access system includes an access controller in communication with a wired access system and a wireless access system. The access controller is configured to determine whether traffic usage data collected from the wired access system and the wireless access system breaches one or more congestion thresholds, determine which of the wired access system and the wireless access system is a breaching access system, and initiate resource reduction at a lower priority access system when a portion of the traffic usage data due to the breaching access system is same or less than a portion of the traffic usage data due to a non-breaching access system traffic usage data, where the lower priority access system is one of the wired access system or the wireless access system.

In implementations, the access controller is further configured to initiate resource reduction at a higher priority access system when a minimum resource threshold is reached by the lower priority access system and congestion is still present. In implementations, the minimum resource threshold maintains a defined level of traffic usage on an applicable one of the wired access system and the wireless access system. In implementations, the resource controller is further configured to initiate resource reduction at the breaching access system when a portion of the traffic usage data due to the breaching access system is greater than a portion of the traffic usage data due to the non-breaching access system.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An access system, comprising:
   a wired access system;
   a wireless access system deployed on the wired access system; and
   a resource controller comprising a processor, wherein the resource controller is in communication with the wired access system and the wireless access system and, the processor is configured to:
   determine whether traffic usage data collected from the wired access system and the wireless access system breaches one or more congestion thresholds;
   determine which of the wired access system and the wireless access system is a breaching access system;
   determine, for the breaching access system, a contributory percentage of the traffic usage data with respect to a breached congestion threshold; and
   initiate resource reduction at a lower priority access system when the contributory percentage of the breaching access system is same or less than a non-breaching access system, wherein the lower priority access system is one of the wired access system or the wireless access system.

2. The access system of claim 1, wherein the processor is further configured to:

initiate resource reduction at a higher priority access system when a minimum resource threshold is reached by the lower priority access system and congestion is still present.

3. The access system of claim 2, wherein the minimum resource threshold maintains a defined level of traffic usage on an applicable one of the wired access system and the wireless access system.

4. The access system of claim 1, wherein the processor is further configured to:
initiate resource reduction at the breaching access system when the contributory percentage of the breaching access system is greater than the non-breaching access system.

5. The access system of claim 4, wherein the processor is further configured to:
initiate resource reduction at the non-breaching access system when a minimum resource threshold is reached by the breaching access system and congestion is still present.

6. The access system of claim 1, wherein a priority for the wired access system and the wireless access system is set based on temporal sliding windows.

7. The access system of claim 1, wherein some of the one or congestion thresholds are weighted more than others of the one or more congestion thresholds.

8. The access system of claim 1, wherein some types of the traffic usage data are weighted more than other types of the traffic usage data.

9. A method for resource management in a converged access system, the method comprising:
determining, by a converged access optimizer, whether traffic usage data collected from a wired access system and a wireless access system breaches one or more congestion thresholds;
determining, by the converged access optimizer, which of the wired access system and the wireless access system is a breaching access system;
determining, by the converged access optimizer for the breaching access system, a traffic usage data contribution level with respect to a breached congestion threshold; and
initiating, by the converged access optimizer, resource reduction at a lower priority access system when the traffic usage data contribution level of the breaching access system is same or less than a non-breaching access system, wherein the lower priority access system is one of the wired access system or the wireless access system.

10. The method of claim 9, further comprising:
initiating, by the converged access optimizer, resource reduction at a higher priority access system when a minimum resource threshold is reached by the lower priority access system and congestion is still present.

11. The method of claim 10, wherein the minimum resource threshold maintains a defined level of traffic usage on an applicable one of the wired access system and the wireless access system.

12. The method of claim 10, further comprising:
initiating, by the converged access optimizer, resource reduction at the breaching access system when the traffic usage data contribution level of the breaching access system is greater than the non-breaching access system.

13. The method of claim 12, further comprising:
initiating, by the converged access optimizer, resource reduction at the non-breaching access system when a minimum resource threshold is reached by the breaching access system and congestion is still present.

14. The method of claim 13, wherein a priority for the wired access system and the wireless access system is set based on temporal sliding windows.

15. The method of claim 14, wherein some of the one or congestion thresholds are weighted more than others of the one or more congestion thresholds.

16. The method of claim 15, wherein some types of the traffic usage data are weighted more than other types of the traffic usage data.

17. A converged access system, comprising:
an access controller in communication with a wired access system and a wireless access system, wherein the access controller comprises a processor and the processor is configured to:
determine whether traffic usage data collected from the wired access system and the wireless access system breaches one or more congestion thresholds;
determine which of the wired access system and the wireless access system is a breaching access system; and
initiate resource reduction at a lower priority access system when a portion of the traffic usage data due to the breaching access system is same or less than a portion of the traffic usage data due to a non-breaching access system traffic usage data, wherein the lower priority access system is one of the wired access system or the wireless access system.

18. The converged access system of claim 17, wherein the processor is further configured to:
initiate resource reduction at a higher priority access system when a minimum resource threshold is reached by the lower priority access system and congestion is still present.

19. The converged access system of claim 18, wherein the minimum resource threshold maintains a defined level of traffic usage on an applicable one of the wired access system and the wireless access system.

20. The converged access system of claim 18, wherein the processor is further configured to:
initiate resource reduction at the breaching access system when a portion of the traffic usage data due to the breaching access system is greater than a portion of the traffic usage data due to the non-breaching access system.

* * * * *